United States Patent
Hong et al.

(10) Patent No.: US 7,115,243 B2
(45) Date of Patent: Oct. 3, 2006

(54) METHOD FOR PREPARING α-ALUMINA NANO POWDER

(75) Inventors: Hye-Jeong Hong, Daejeon (KR); Tae-Hyun Kwon, Daejeon (KR); Seung-Beom Cho, Daejeon (KR); Jun-Seok Nho, Daejeon (KR); Dae-Gon Han, Daejeon (KR)

(73) Assignee: LG Chem, Ltd., (KR)

( * ) Notice: Subject to any disclaimer, the term of this patent is extended or adjusted under 35 U.S.C. 154(b) by 455 days.

(21) Appl. No.: 10/469,882

(22) PCT Filed: Jan. 3, 2003

(86) PCT No.: PCT/KR03/00009

§ 371 (c)(1),
(2), (4) Date: Sep. 3, 2003

(87) PCT Pub. No.: WO03/059819

PCT Pub. Date: Jul. 24, 2003

(65) Prior Publication Data

US 2005/0106096 A1    May 19, 2005

(30) Foreign Application Priority Data

Jan. 4, 2002    (KR) ...................... 10-2002-0000468

(51) Int. Cl.
*C01F 7/02* (2006.01)
(52) U.S. Cl. ...................... 423/625; 423/111; 977/775; 977/811
(58) Field of Classification Search ................ 423/111, 423/625, 628; 977/775, 811
See application file for complete search history.

(56) References Cited

U.S. PATENT DOCUMENTS

H000189 H * 1/1987 Bauer .......................... 423/111
4,822,592 A * 4/1989 Misra .......................... 423/627
6,162,413 A * 12/2000 Fujiwara et al. ............. 423/625
2005/0135995 A1* 6/2005 Wang ........................ 423/625
2005/0204513 A1* 9/2005 Kajihara et al. ............... 23/301

FOREIGN PATENT DOCUMENTS

| EP | 0 522 519 A2 | 1/1993 |
| JP | 59-3020 | 1/1984 |
| JP | 60-103024 | 6/1985 |
| JP | 60-166219 | 8/1985 |
| JP | 62-105921 | 5/1987 |
| WO | WO 98/55400 | 12/1998 |

OTHER PUBLICATIONS

"High-Temperature Synthesis of Materials: Glycothermal Synthesis of Alpha Aluminum Oxide"; Authors: Nelson S. Bell, Seung-Beom Cho and James H. Adair; American Chemical Society, No. 681; 1998; pp. 120-133.
"Size Control of α-Alumina Particles Synthesized in 1, 4-Butanediol Solution by α-Alumina and α-Hematite Seeding"; Authors: Nelson S. Bell, Seung-Beom Cho and James H. Adair; Journal of American Ceramic Society, vol. 81, No. 6; Jun. 1998; pp. 1411-1420.
International Search Report; International application No. PCT/KR03/00009; International filing date: Jan. 3, 2003; Date of Mailing: Apr. 26, 2003.

* cited by examiner

*Primary Examiner*—Timothy Vanoy
(74) *Attorney, Agent, or Firm*—Cantor Colburn LLP

(57) ABSTRACT

The present invention relates to a preparation method of α-alumina nano powder, and more particularly to a preparation method of α-alumina nano powder that has a uniform particle shape and size distribution, is capable of being produced at a low temperature, and contains less than 20 ppm of alkali metals such as Na and K. the α-alumina nano powder is prepared by glycolating aluminium alkoxide in glycol solution containing the α-iron oxide or α-alumina nucleation seed and carrying out glyco thermal reaction.

7 Claims, 5 Drawing Sheets

METHOD FOR PREPARING α-ALUMINA NANO POWDER

BACKGROUND OF THE INVENTION (a) Field of the Invention

The present invention relates to a preparation method of α-alumina nano powder, and more particularly to a preparation method of α-alumina nano powder which has uniform particle shape and size distribution, is capable of being produced at a low temperature, and contains less than 20 ppm of alkali metals such as Na and K.

(b) Description of the Related Art

In today's applied technology field, interest in nano technology, including nano particles, nano structure, and nano devices, is on the increase. Especially in the semiconductor industry, the need of a much finer linewidth of wires and multiple wiring is increasing with regard to super-integrated circuits.

The chemical-mechanical planarization (CMP) technique is an important high-level planarization technique that completely removes differences in wiring gaps of multiple circuits. In chemical-mechanical planarization, a chemically-treated surface is polished by mechanical movement of a slurry and a pad. The slurry used in the chemical-mechanical planarization refers to a solution wherein an abrasive with a dimension of tens to hundreds of nanometers is suspended in pure water. The abrasion rate and post-abrasion defects depend on the kind, size, and concentration of the abrasive.

α-Alumina has superior mechanical, electrical, and optical properties, and is widely used for abrasives, plasma sprays, fillers, sintering materials, fluorescent materials, insulators, optical materials, etc. In particular, α-alumina having a fine and uniform structure and narrow particle size distribution is required as a precision abrasive. The Bayer method makes mass production of α-alumina powder possible by converting bauxite to aluminum hydroxide or transition alumina and calcinating it in the air. However, α-alumina having superior crystallinity and purity cannot be obtained by this method. Also, due to the huge agglomeration of aluminum hydroxide or transition alumina, α-alumina powder tends to have a coarse and irregular particle structure. Moreover, a high temperature of about 1,230° C. is required for complete transition, since the degree of transition depends on temperature and time of heat treatment.

As solutions to these problems, research on solution-powder synthesis, such as the sol-gel method, hydrothermal method, and co-precipitation method, are actively in progress. The solution-powder synthesis method offers stoichiometric crystalline ceramic particles of good purity. In particular, the hydrothermal method is capable of growing single-crystal particles at a very much lower temperature and of controlling particle size and shape. Therefore, this method is widely being researched and commercially applied. The problem of α-alumina synthesis by the hydrothermal method is that it takes an excessive amount of time because of the high temperature and pressure that are required.

In this regard, research on synthesis using organic solvent instead of aqueous solution is being carried out. Adair, et al. synthesized α-alumina having a narrow particle size distribution using glycol, which is a secondary alcohol. Also, they could control particle size and shape by regulating the concentration of the nucleation seed and stirring rate. However, if aluminum hydroxide obtained from the precipitation method is used as a precursor, contamination by alkali metals such as Na and K is inevitable, and high-purity α-alumina cannot be obtained.

Accordingly, there is a need for a method for preparing high-purity α-alumina having a uniform particle shape and size distribution and that is safe from contamination by alkali metals such as Na and K.

SUMMARY OF THE INVENTION

An object of the present invention is to provide a method for preparing high-purity spherical α-alumina nano powder having a uniform particle shape and size distribution, which is capable of being produced at a low temperature, and is safe from contamination by alkali metals such as Na and K.

In order to achieve this object, the present invention provides a method for preparing α-alumina nano powder, which comprises:

a) a step of glycolation of aluminum alkoxide in a glycol solution containing the α-iron oxide or α-alumina nucleation seed; and b) a step of glycol thermal reaction.

DETAILED DESCRIPTION OF THE PREFERRED EMBODIMENTS

Figure 1:
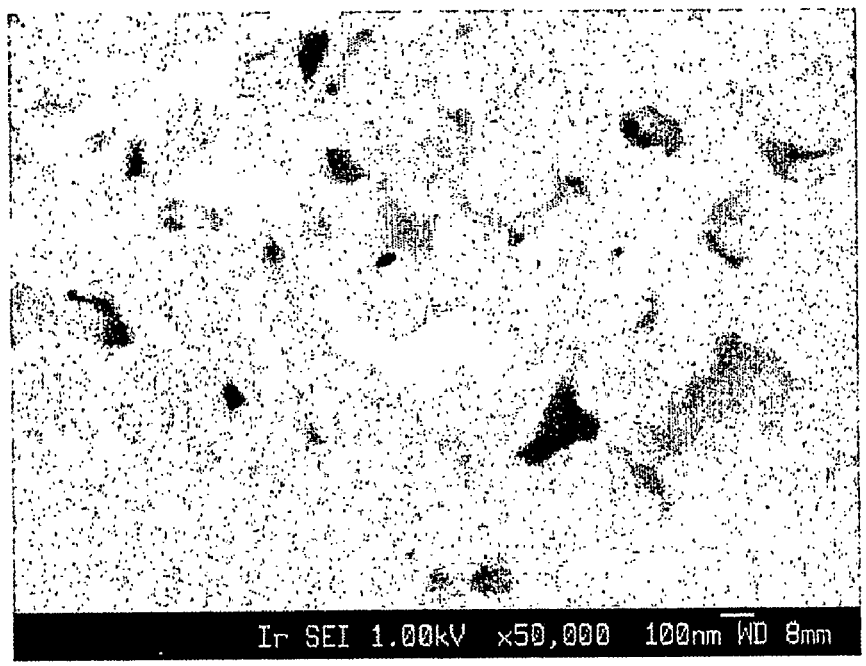
FIG. 1 is a FESEM photograph (×50,000) of α-alumina powder according to one embodiment of the present invention (Example 1).
Figure 2:
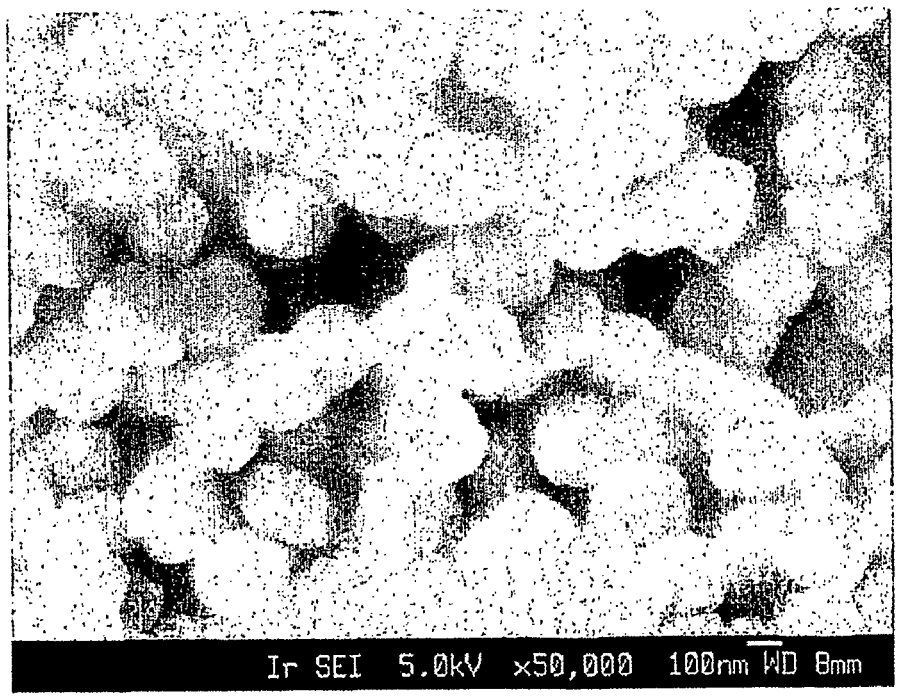
FIG. 2 is a FESEM photograph (×50,000) of α-alumina powder according to another embodiment of the present invention (Example 2).

The present inventors worked to develop a preparing method of high-purity α-alumina nano powder having a uniform particle shape and size distribution. As a result, they realized that α-alumina nano powder, prepared by glycolation of aluminum alkoxide in a glycol solution containing the α-iron oxide or α-alumina nucleation seed and carrying out a glycol thermal reaction, has a uniform particle shape and size distribution, is capable of being produced at a low temperature, and has very good purity because contamination by alkali metals such as Na and K is reduced.

The method for preparing α-alumina nano powder of the present invention is characterized by glycolation of aluminum alkoxide in a glycol solution containing the α-iron oxide or α-alumina nucleation seed, and carrying out a glycol thermal reaction.

The particle size of the α-iron oxide and α-alumina used in step a) of the present invention is preferably 50 to 60 nm. In the present invention, α-iron oxide prepared by the MacCallum method (R. B. MacCallum, Preparation of Ferric Oxide Sols and Sol Particles, U.S. Pat. No. 3,267,041, Aug. 16, 1966) was used.

Firstly, 22.7 g of $Fe(NO_3)_3 \cdot 9H_2O$ is dissolved in 100 mL of distilled water. 30 mL of aqueous ammonia solution (28%) is slowly added while stirring the solution to precipitate it. The precipitate is washed with distilled water 5 times using a centrifuge, 12.5 mL of glacial acetic acid (29%) is added thereto, and the solution is stirred for 18 hours. The stirred sol solution is then stirred at 80° C. for 48 hours using a reflux system, washed with ethanol 5 times using a centrifuge, and dispersed in 500 mL of ethanol. The sol solution is subsequently heated to 200° C., and added dropwise to 1,4-butanediol to evaporate the glacial acetic acid. Consequently, a seed solution wherein α-iron oxide is dispersed in 1,4-butanediol is obtained.

AKP50 having a particle size of 200 to 250 nm is crushed to be used as the α-alumina seed of step a).

The α-iron oxide and the α-alumina determine the initial particle size, and the particle size of the α-alumina nano powder can be controlled by the seed concentration. Phase transition control of the seed becomes effective when several parameters are satisfied.

The α-iron oxide and the α-alumina have very similar structures, differing by only about 5%. Also, dispersion properties of the fine α-iron oxide make it suitable as an aluminum precursor in the 1,4-butanediol solution. Accordingly, addition of α-iron oxide greatly facilitates phase transition to α-alumina, thereby contributing to epitaxial nuclear growth and particle growth of α-alumina. Also, when α-iron oxide is added as a seed in the solution-powder method, preparation of alumina at a low temperature becomes possible and the particle size of α-alumina can be controlled by the seed concentration.

The glycol solution used in step b) of the present invention is preferably 1,4-butanediol.

The aluminum alkoxide used in step b) of the present invention is preferably aluminum isopropoxide, and it is preferably used at 0.25 to 1.0M per liter of the glycol solution of step a).

The content of aluminum alkoxide affects the reaction time and crystal growth of the product. When the particle size is fatal and the yield can be ignored, a lower concentration of aluminum alkoxide is better to obtain smaller particles.

Metal alkoxide and alcohol react stoichiometrically, and the reaction byproduct, which is water or alcohol, does not affect the product and can be easily removed. Accordingly, it is preferred that the glycolation of step a) of the present invention is carried out in the air rather than in a reflux system, so that the glycolation byproduct, i.e., isopropanol, may not affect the shape of the α-alumina.

A seed solution, wherein α-iron oxide or α-alumina is dispersed in ethanol in an appropriate ratio, is prepared. This solution is added to 1,4-butanediol, which is a glycol solution. After heating the solution to over 100° C., 0.25 to 1.0M of aluminum isopropoxide per liter of the glycol solution is slowly added thereto while stirring it. The mixture solution is heated to 200° C. and stirred vigorously for 2 hours to glycolate the aluminum. When the glycolation is completed, the mixture solution is put in a high-pressure reactor for glyco thermal reaction.

During the glyco thermal reaction, the heating rate to the reaction temperature is preferably 3° C./min. Preferably, the glyco thermal reaction time is carried out for at least 3 to 48 hours at over 230° C. if α-alumina is the nucleation seed, and for at least 3 to 48 hours at over 250° C. if α-iron oxide is the nucleation seed.

The prepared reaction product is washed with ethanol and dispersed in ethanol.

The preparing method of the present invention offers α-alumina nano powder having a uniform shape and particle size. Additionally, the concentration of alkali metals such as Na and K can be reduced to below 20 ppm when aluminum alkoxide is used as a precursor. Also, α-alumina nano powder can be prepared at a low temperature.

Hereinafter, the present invention is described in more detail through Examples. However, the following Examples are only for the understanding of the present invention, and the present invention is not limited to the following Examples.

EXAMPLES

Example 1

(Preparation of Seed Solution)

α-iron oxide seed solution was prepared as follows.

22.7 g of $Fe(NO_3)_3 \cdot 9H_2O$ (α-iron oxide) were dissolved in 100 mL of distilled water, then 30 mL of aqueous ammonia solution (28%) were slowly added while stirring the solution to precipitate it. The precipitate was washed with distilled water 5 times using a centrifuge, 12.5 mL of glacial acetic acid (29%) were added to it, and the solution was stirred for 18 hours. The stirred sol solution was then stirred at 80° C. for 48 hours using a reflux system, washed with ethanol 5 times using a centrifuge, and dispersed in 500 mL of ethanol. The sol solution was subsequently heated to 200° C., and added dropwise to 1,4-butanediol to evaporate the glacial acetic acid. Consequently, a seed solution wherein α-iron oxide was dispersed in 1,4-butanediol was obtained.

(Preparation of α-Alumina Nano Powder)

20 mL of α-iron oxide seed solution dispersed in ethanol were added to 200 mL of 1,4-butanediol (Yakuri). This solution was let alone for over 30 minutes at 100° C. for the ethanol to evaporate. 30.64 g of aluminum isopropoxide (Yakuri) (1.532 g/10 mL 1,4-butanediol) were slowly added to the solution, and glycolation was carried out for 2 hours at 200° C. Concentration of the seed solution was $1 \times 10^{13}$ particles per milliliter of the total solution, and concentration of aluminum isopropoxide was 0.75M per liter of 1,4-butanediol. After the glycolation was completed, 500 mL of the sol solution were put in a high-pressure reactor having a nickel (Ni) liner. The glyco thermal reaction was carried out for 24 hours at 275° C. while stirring the solution with a magnetic bar to obtain α-alumina powder having a particle size of 180 to 250 nm.

Example 2

5 mL of α-iron oxide seed solution dispersed in ethanol, which was prepared in Example 1, were added to 50 mL of 1,4-butanediol. This solution was let alone for over 30 minutes at 100° C. for the ethanol to evaporate. 7.66 g of aluminum isopropoxide (1.532 g/10 mL 1,4-butanediol) were slowly added to the solution, and glycolation was carried out for 2 hours at 200° C. Concentration of the seed solution was $1 \times 10^{13}$ particles per milliliter of the total solution, and concentration of aluminum isopropoxide was 0.75M per liter of 1,4-butanediol. After the glycolation was completed, 100 mL of the sol solution were put in a high-pressure reactor having a Teflon liner. The glyco thermal reaction was carried out for 48 hours at 250° C. while stirring the solution with a magnetic bar to obtain α-alumina powder having a particle size of 200 to 300 nm.

Example 3

10 mL of α-iron oxide seed solution dispersed in ethanol, which was prepared in Example 1, were added to 50 mL of 1,4-butanediol. This solution was let alone for over 30 minutes at 100° C. for the ethanol to evaporate. 2.55 g of aluminum isopropoxide (0.511 g/10 mL 1,4-butanediol) were slowly added to the solution, and glycolation was carried out for 2 hours at 200° C. Concentration of the seed solution was $2 \times 10^{13}$ particles per milliliter of the total solution, and concentration of aluminum isopropoxide was 0.25M per liter of 1,4-butanediol. After the glycolation was completed, 100 mL of the sol solution were put in a high-pressure reactor having a Teflon liner. The glyco thermal reaction was carried out for 48 hours at 250° C. while stirring the solution with a magnetic bar to obtain α-alumina powder having a particle size of 100 to 150 nm.

Example 4

10 mL of α-iron oxide seed solution dispersed in ethanol, which was prepared in Example 1, were added to 50 mL of 1,4-butanediol. This solution was let alone for over 30 minutes at 100° C. for the ethanol to evaporate. 5.11 g of aluminum isopropoxide (1.021 g/10 mL 1,4-butanediol) were slowly added to the solution, and glycolation was carried out for 2 hours at 200° C. Concentration of the seed solution was $2 \times 10^{13}$ particles per milliliter of the total solution, and concentration of aluminum isopropoxide was 0.50M per liter of 1,4-butanediol. After the glycolation was completed, 100 mL of the sol solution were put in a high-pressure reactor having a Teflon liner. The glyco thermal reaction was carried out for 48 hours at 250° C. while stirring the solution with a magnetic bar to obtain α-alumina powder having a particle size of 150 to 200 nm.

Example 5

10 mL of α-iron oxide seed solution dispersed in ethanol, which was prepared in Example 1, were added to 50 mL of 1,4-butanediol. This solution was let alone for over 30 minutes at 100° C. for the ethanol to evaporate. 7.66 g of aluminum isopropoxide (1.532 g/10 mL 1,4-butanediol) were slowly added to the solution, and glycolation was carried out for 2 hours at 200° C. Concentration of the seed solution was $2 \times 10^{13}$ particles per milliliter of the total solution, and concentration of aluminum isopropoxide was 0.75M per liter of 1,4-butanediol. After the glycolation was completed, 100 mL of the sol solution were put in a high-pressure reactor having a Teflon liner. The glyco thermal reaction was carried out for 48 hours at 250° C. while stirring the solution with a magnetic bar to obtain α-alumina powder having a particle size of 180 to 250 nm.

Example 6

10 mL of α-iron oxide seed solution dispersed in ethanol, which was prepared in Example 1, were added to 50 mL of 1,4-butanediol. This solution was let alone for over 30 minutes at 100° C. for the ethanol to evaporate. 2.55 g of aluminum isopropoxide (0.511 g/10 mL 1,4-butanediol) were slowly added to the solution, and glycolation was carried out for 2 hours at 200° C. Concentration of the seed solution was $2 \times 10^{13}$ particles per milliliter of the total solution, and concentration of aluminum isopropoxide was 0.25M per liter of 1,4-butanediol. After the glycolation was completed, 100 mL of the sol solution were put in a high-pressure reactor having a Teflon liner. The glyco thermal reaction was carried out for 48 hours at 250° C. while stirring the solution with a magnetic bar to obtain α-alumina powder having a particle size of 100 to 500 nm.

Example 7

10 mL of α-iron oxide seed solution, which was prepared in Example 1 and was not washed using a centrifuge, were added dropwise to 50 mL of 1,4-butanediol to evaporate glacial acetic acid in the seed solution. 1,4-butanediol was added so that the volume of the glycol solution containing the dispersed seed solution became 50 mL. This solution was heated to 100° C. 7.66 g of aluminum isopropoxide (1.532 g/10 mL 1,4-butanediol) were slowly added to the solution, and glycolation was carried out for 2 hours at 200° C. Concentration of the seed solution was $2 \times 10^{13}$ particles per milliliter of the total solution, and concentration of aluminum isopropoxide was 0.75M per liter of 1,4-butanediol. After the glycolation was completed, 100 mL of the sol solution were put in a high-pressure reactor having a Teflon liner. The glyco thermal reaction was carried out for 48 hours at 250° C. while stirring the solution with a magnetic bar to obtain α-alumina powder having a particle size of 100 to 150 nm.

Example 8

10 mL of α-iron oxide seed solution dispersed in ethanol, which was prepared in Example 1, were added to 50 mL of 1,4-butanediol. This solution was let alone for over 30 minutes at 100° C. for the ethanol to evaporate. 7.66 g of aluminum isopropoxide (1.532 g/10 mL 1,4-butanediol) were slowly added to the solution, and glycolation was carried out for 2 hours at 200° C. Concentration of the seed solution was $2 \times 10^{11}$ particles per milliliter of the total solution, and concentration of aluminum isopropoxide was 0.75M per liter of 1,4-butanediol. After the glycolation was completed, 100 mL of the sol solution were put in a high-pressure reactor having a Teflon liner. The glyco thermal reaction was carried out for 48 hours at 230° C. while stirring the solution with a magnetic bar to obtain cl-alumina powder having a particle size of 200 to 250 nm.

Example 9

20 mL of α-iron oxide seed solution dispersed in ethanol, which was prepared in Example 1, were added to 200 mL of 1,4-butanediol. This solution was let alone for over 30 minutes at 100° C. for the ethanol to evaporate. 30.64 g of aluminum isopropoxide (1.532 g/10 mL 1,4-butanediol) were slowly added to the solution, and glycolation was carried out for 2 hours at 200° C. Concentration of the seed solution was $1 \times 10^{11}$ particles per milliliter of the total solution, and concentration of aluminum isopropoxide was 0.75M per liter of 1,4-butanediol. After the glycolation was completed, 500 mL of the sol solution were put in a high-pressure reactor having a nickel liner. The glyco thermal reaction was carried out for 12 hours at 275° C. while stirring the solution with a magnetic bar to obtain α-alumina powder having a particle size of 500 to 600 nm.

Example 10

20 mL of α-iron oxide seed solution dispersed in ethanol, which was prepared in Example 1, were added to 200 mL of 1,4-butanediol. This solution was let alone for over 30 minutes at 100° C. for the ethanol to evaporate. 10.31 g of aluminum isopropoxide (0.511 g/10 mL 1,4-butanediol) were slowly added to the solution, and glycolation was carried out for 2 hours at 200° C. Concentration of the seed solution was $1 \times 10^{11}$ particles per milliliter of the total solution, and concentration of aluminum isopropoxide was 0.25M per liter of 1,4-butanediol. After the glycolation was completed, 500 mL of the sol solution were put in a high-pressure reactor having a nickel liner. The glyco thermal reaction was carried out for 12 hours at 275° C. while stirring the solution with a magnetic bar to obtain α-alumina powder having a particle size of 200 to 400 nm.

Test Example

Particle shape of α-alumina powder prepared in Examples 1 to 10 was observed with a FESEM (field emission scanning electron microscope; ×30,000, ×50,000). The results are shown in FIGS. 1 to 10.

As seen in FIGS. 1 to 10, the prepared α-alumina powder has a spherical shape and uniform particle size distribution.

Figure 3:
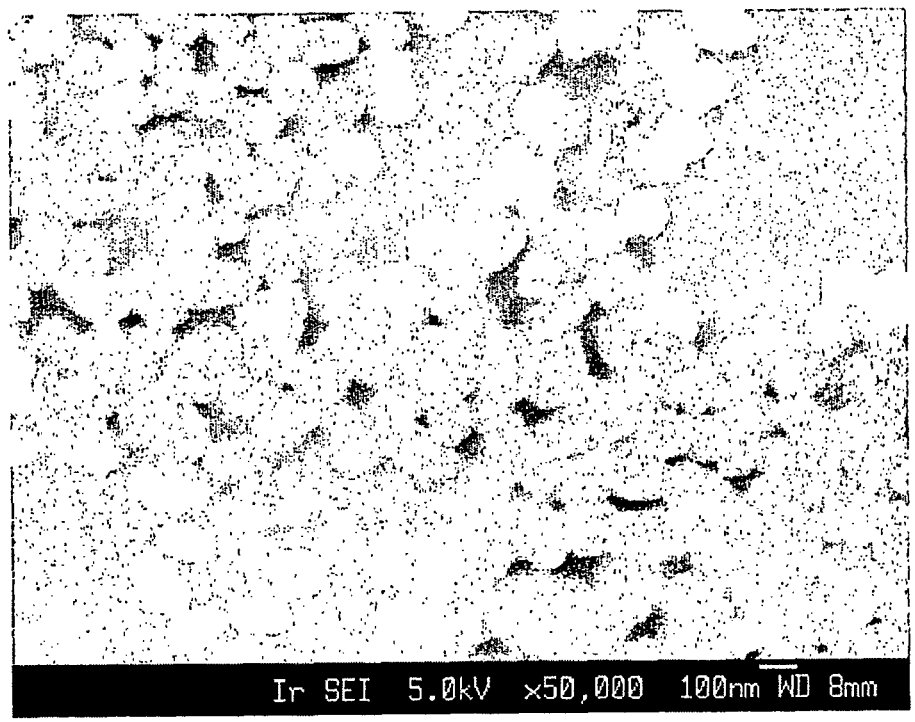
FIG. 3 is a FESEM photograph (×50,000) of α-alumina powder according to another embodiment of the present invention (Example 3).
Figure 4:
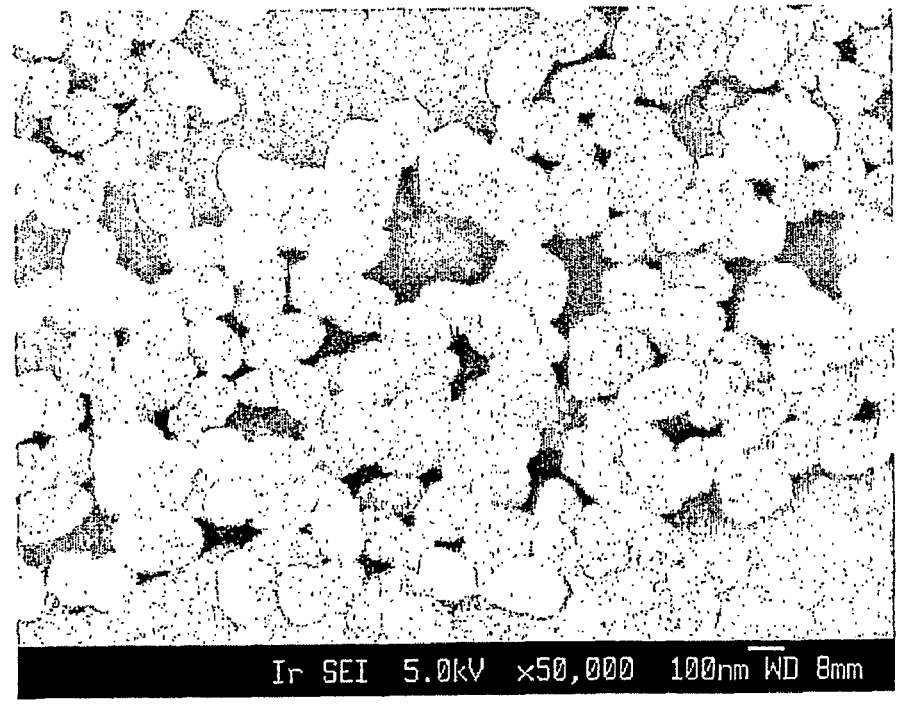
FIG. 4 is a FESEM photograph (×50,000) of α-alumina powder according to another embodiment of the present invention (Example 4).
Figure 5:
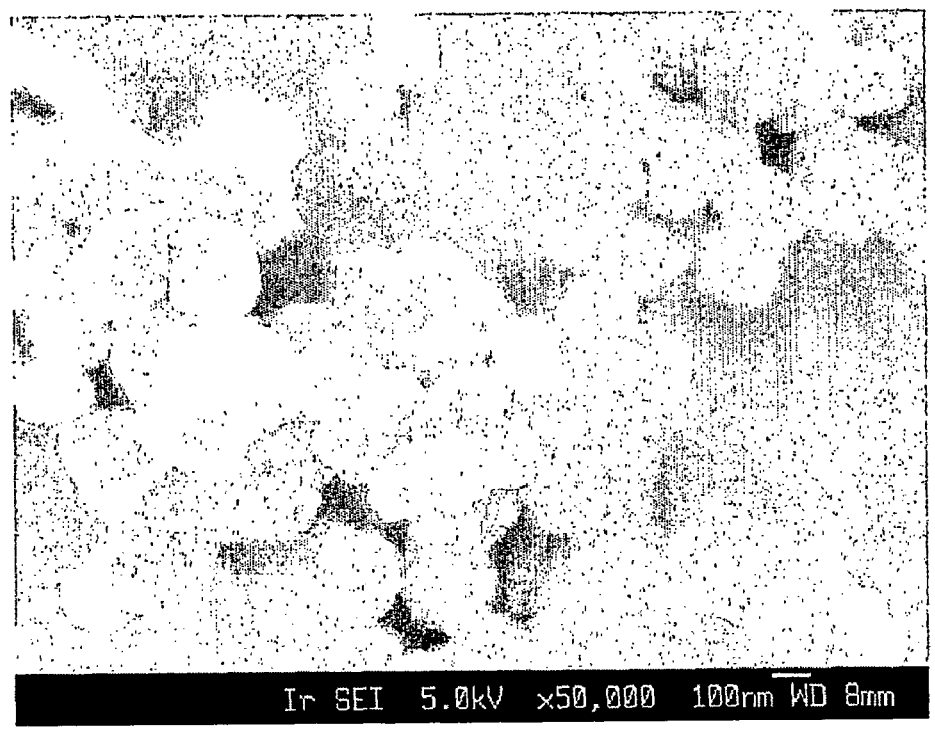
FIG. 5 is a FESEM photograph (×50,000) of α-alumina powder according to another embodiment of the present invention (Example 5).
Figure 6:
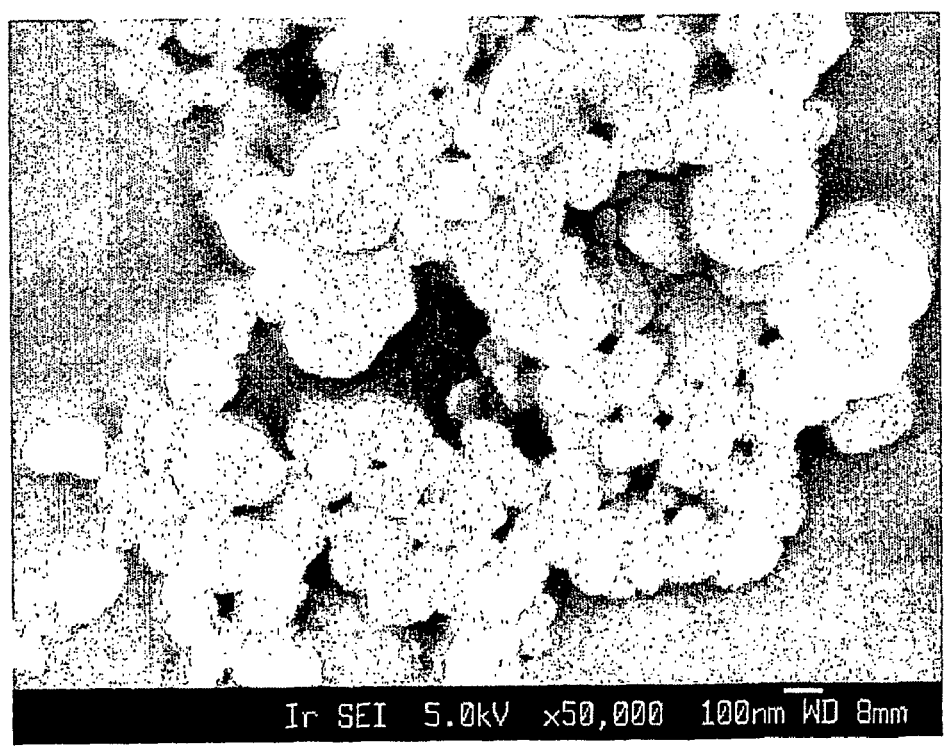
FIG. 6 is a FESEM photograph (×50,000) of α-alumina powder according to another embodiment of the present invention (Example 6).
Figure 7:
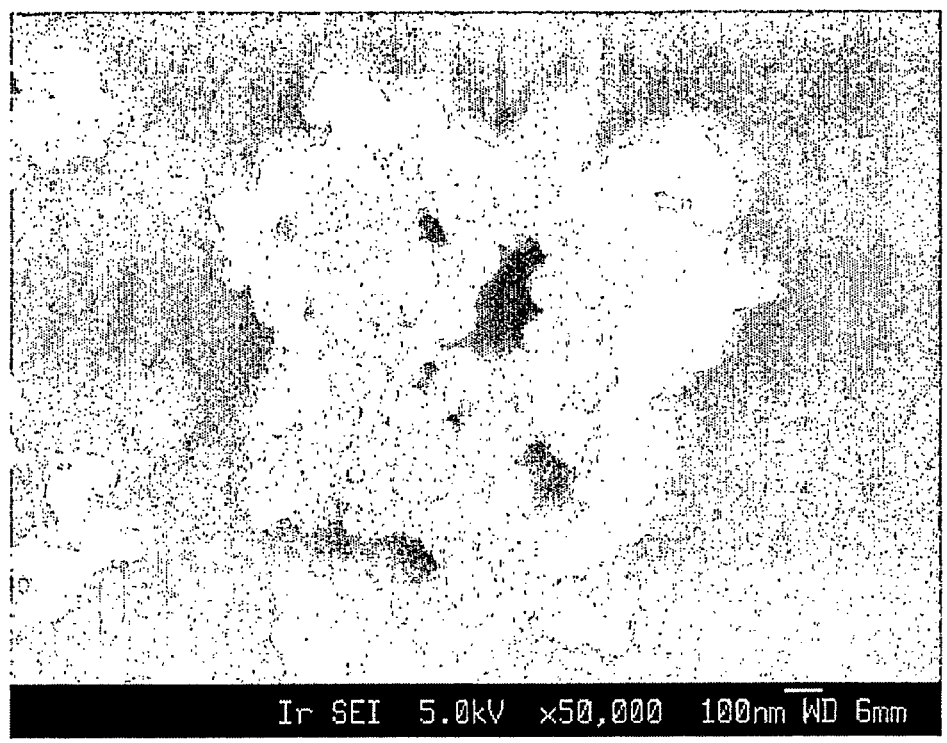
FIG. 7 is a FESEM photograph (×50,000) of α-alumina powder according to another embodiment of the present invention (Example 7).
Figure 8:
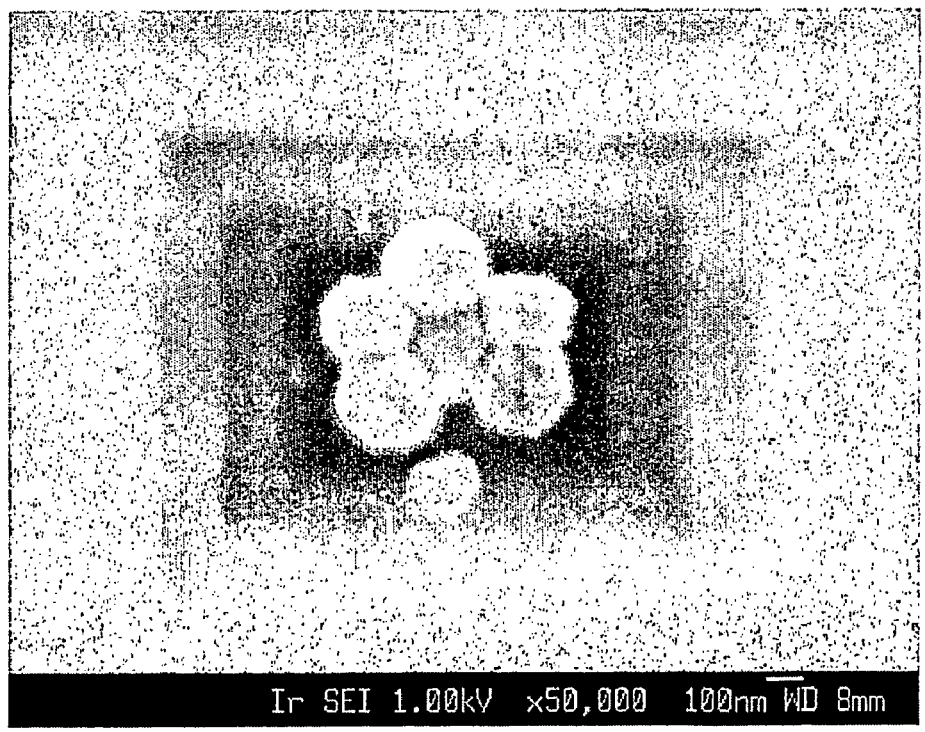
FIG. 8 is a FESEM photograph (×50,000) of α-alumina powder according to another embodiment of the present invention (Example 8).
Figure 9:
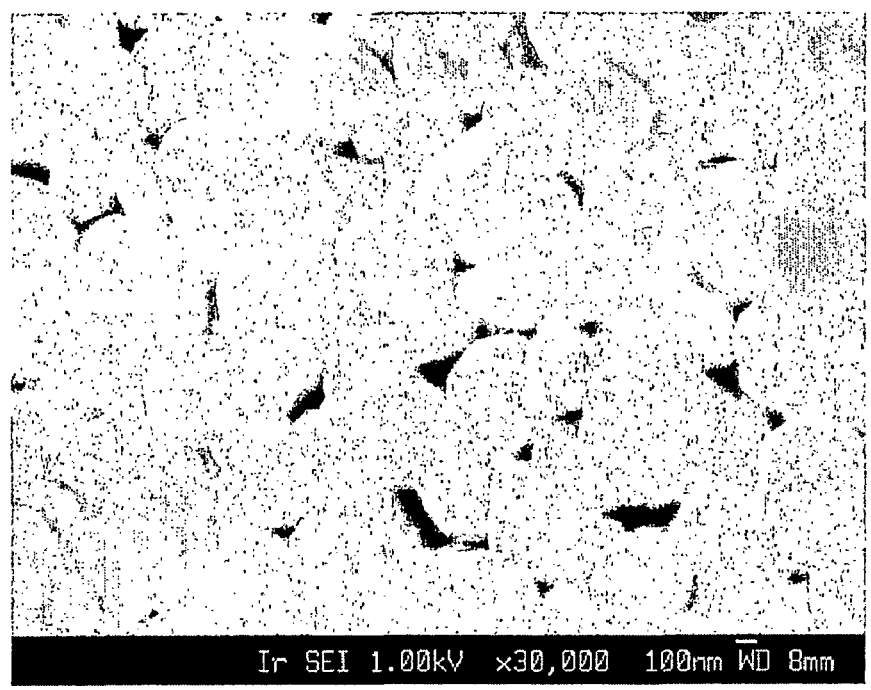
FIG. 9 is a FESEM photograph (×50,000) of α-alumina powder according to another embodiment of the present invention (Example 9).
Figure 10:
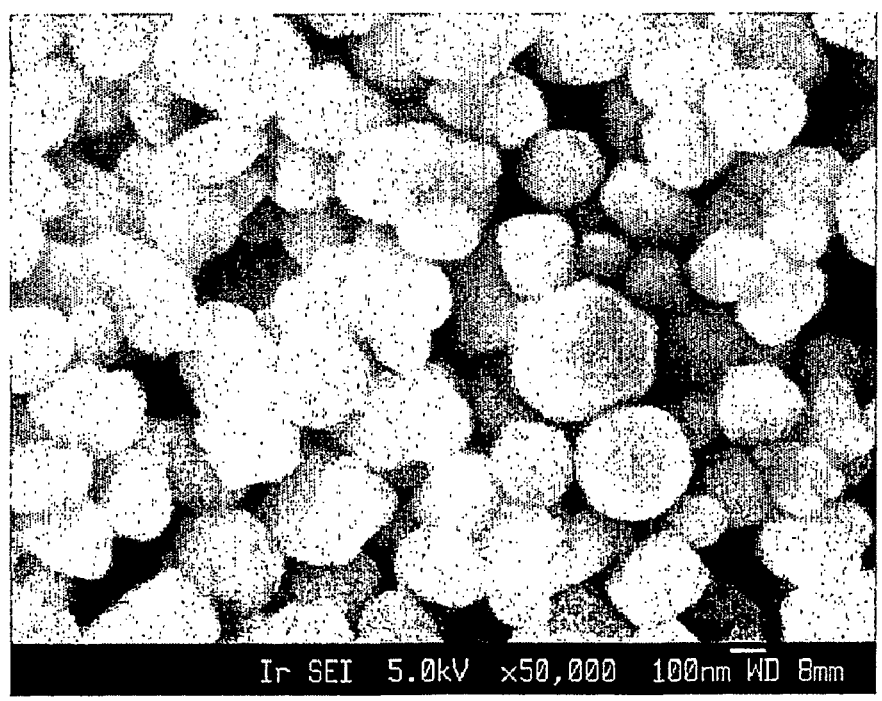
FIG. 10 is a FESEM photograph (×50,000) of α-alumina powder according to another embodiment of the present invention (Example 10).

As seen in FIGS. 3 to 5, the higher the content of aluminum isopropoxide, the larger the particle size of α-alumina. From FIG. 3 and FIG. 6, it was identified that stirring is necessary to obtain uniform particle size distribution. Also, from FIG. 5 and FIG. 7, it was identified that the seed treatment method affects the particle size of α-alumina powder, and that evaporating impurities in the seed solution and directly dispersing it in glycol further decreases the particle size compared to washing the seed solution by centrifuge. Also, from FIG. 8 and FIG. 9, it was identified that a fine and uniform particle size distribution can be obtained at a low temperature even though it takes time.

As apparent from the above description, α-alumina nano powder prepared by the present invention has a uniform particle shape and size distribution, is capable of being produced at a low temperature, and has very good purity because contamination by alkali metals such as Na and K is reduced when aluminum alkoxide is used as a precursor.

While the present invention has been described in detail with reference to the preferred embodiments, those skilled in the art will appreciate that a variety of modifications and substitutions can be made thereto without departing from the spirit and scope of the present invention as set forth in the appended claims.

What is claimed is:

1. A method for preparing α-alumina nano powder, which comprises: a) a step of glycolation of aluminum alkoxide in glycol solution containing the α-iron oxide or α-alumina nucleation seed; and b) a step of glycol thermal reaction.

2. The method for preparing α-alumina nano powder according to claim 1, wherein particle size of the α-iron oxide and α-alumina nucleation seeds is 50 to 60 nm.

3. The method for preparing α-alumina nano powder according to claim 1, wherein concentration of the aluminum alkoxide is 0.25 to 1.0 moles per liter of the glycol solution.

4. The method for preparing α-alumina nano powder according to claim 1, wherein the glycolation is carried out in the air.

5. The method for preparing a-alumina nano powder according to claim 1, wherein the glyco thermal reaction is carried out for at least 3 to 48 hours over 230° C. if α-alumina is the nucleation seed, and for at least 3 to 48 hours over 250° C. if α-iron oxide is the nucleation seed.

6. The method for preparing α-alumina nano powder according to claim 1, wherein the α-alumina nano powder contains less than 20 ppm of alkali metals, wherein the alkali metals are Na or K.

7. The method for preparing α-alumina nano powder according to claim 1, wherein the α-alumina nano powder has a spherical shape.

* * * * *